United States Patent
Benazzi et al.

(10) Patent No.: US 6,733,658 B2
(45) Date of Patent: *May 11, 2004

(54) EU-1 ZEOLITE CATALYST AND A PROCESS FOR THE REDUCTION OF THE POUR POINT OF FEEDS CONTAINING PARAFFINS

(75) Inventors: Eric Benazzi, Chatou (FR); Nathalie George-Marchal, Paris (FR); Christophe Gueret, Vienne (FR); Patrick Briot, Vienne (FR); Alain Billon, Le Vesinet (FR); Pierre Marion, Paris (FR)

(73) Assignee: Institut Francais du Petrole, Rueil Malmaison (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,528

(22) Filed: Jun. 24, 1998

(65) Prior Publication Data

US 2003/0127356 A1 Jul. 10, 2003

(30) Foreign Application Priority Data

Jun. 25, 1997 (FR) .............................. 97 07928

(51) Int. Cl.$^7$ .............................. C10G 47/16; C07C 5/22
(52) U.S. Cl. .................. 208/111.01; 208/27; 208/111.3; 208/111.35; 585/739
(58) Field of Search .............................. 208/27, 111.01, 208/111.3, 111.35; 585/739; 423/713, 714, 715; 502/85, 86, 63, 66, 74

(56) References Cited

U.S. PATENT DOCUMENTS

| 3,442,795 | A | * | 5/1969 | Kerr et al. ................. 502/85 |
| 3,506,400 | A | * | 4/1970 | Eberly et al. |
| 4,273,753 | A | | 6/1981 | Chang |
| 4,503,023 | A | | 3/1985 | Breck et al. |
| 4,537,754 | A | | 8/1985 | Casci et al. |
| 4,576,805 | A | * | 3/1986 | Chang et al. ............. 423/715 |
| 4,593,138 | A | | 6/1986 | Casci et al. |
| 4,640,829 | A | * | 2/1987 | Rubin ..................... 423/706 |
| 4,711,770 | A | | 12/1987 | Skeels et al. |
| 4,753,910 | A | * | 6/1988 | Han et al. ................ 423/715 |
| 4,836,911 | A | | 6/1989 | Skeels et al. |
| 4,855,530 | A | * | 8/1989 | LaPierre et al. ............ 585/739 |
| 4,876,411 | A | * | 10/1989 | Bowes et al. ............... 502/85 |
| 4,954,243 | A | | 9/1990 | Kuehl et al. |
| 5,174,980 | A | * | 12/1992 | Hellring et al. ............ 423/706 |
| 5,234,872 | A | * | 8/1993 | Apelian et al. ............. 502/85 |
| 5,242,676 | A | * | 9/1993 | Apelian et al. ............. 502/85 |
| 5,310,534 | A | | 5/1994 | Fajula et al. |
| 5,425,934 | A | * | 6/1995 | Malla et al. ............... 423/714 |
| 5,935,414 | A | * | 8/1999 | Sonnemans et al. .......... 208/58 |

FOREIGN PATENT DOCUMENTS

| EP | 042 226 | 5/1981 |
| EP | 142313 | 11/1984 |
| EP | 190949 | 8/1986 |
| EP | 431448 | 11/1990 |
| EP | 488867 | 11/1991 |
| WO | 93/02994 | 2/1993 |

OTHER PUBLICATIONS

Abstract of JP 61 201 618., Sep. 1986.
Rao et al., "Thermal and hydRothermal stabilities of zeolite EU–1", Applied Catalysts, vol. 119, 1994, pp. 33–43, no month.
Rao et al., "Synthesis and characterization of high–silica EU–1", ZEOLITES, vol. 9, Nov. 1989, pp. 483–490.
W.M. Meier et al., "Atlas of zeolite structure types", 1992, pp. 94–95, no month.

* cited by examiner

Primary Examiner—Walter D. Griffin
(74) Attorney, Agent, or Firm—Millen, White, Zelano & Branigan, P.C.

(57) ABSTRACT

The invention concerns a process for improving the pour point of a feed comprising paraffins containing more than 10 carbon atoms, in which process the feed to be treated is brought into contact with a catalyst comprising an EU-1 zeolite and at least one hydro-dehydrogenating element, at a temperature which is in the range 170° C. to 500° C., a pressure in the range 1 to 250 bar and an hourly space velocity in the range 0.05 to 100 h$^{-1}$, in the presence of hydrogen in a proportion of 50 to 2000 l/l of feed. The oils obtained have good pour points and high viscosity indices (VI). The process is also applicable to gas oils and other feeds requiring a reduction of pour point. The invention also concerns an EU-1 zeolite from which a portion of elements T (Al, Ga, Fe or B) have been removed and which has an Si/T atomic ratio of at least 10.

29 Claims, No Drawings

EU-1 ZEOLITE CATALYST AND A PROCESS FOR THE REDUCTION OF THE POUR POINT OF FEEDS CONTAINING PARAFFINS

The present invention concerns a process for improving the pour point of feeds containing linear and/or slightly branched, long (more than 10 carbon atoms) paraffins, to provide good yields on converting feeds with high pour points to at least one cut with a low pour point and a high viscosity index for oil bases.

The present invention also concerns a EU-1 zeolite from which a portion of the elements Al, Fe, Ga or B has been removed, for example dealuminated, a catalyst containing that zeolite, its use in converting hydrocarbons, and a process for reducing the pour point using that catalyst.

BACKGROUND OF THE INVENTION

High quality lubricants are fundamentally important for the proper operation of modern machines, automobiles and trucks. However, the quantity of paraffins originating directly from untreated crude oil with properties which are suitable for use in good lubricants is very low with respect to the increasing demand in this sector.

Heavy oil fractions containing large amounts of linear or slightly branched paraffins must be treated in order to obtain good quality oil bases in the best possible yields, using an operation which aims to eliminate the linear or slightly branched paraffins from feeds which are then used as base stock, or as kerosene or jet fuel.

High molecular weight paraffins which are linear or very slightly branched which are present in the oils or kerosene or jet fuel result in high pour points and thus in coagulation for low temperature applications. In order to reduce the pour points, such linear paraffins which are not or are only slightly branched must be completely or partially eliminated.

This operation can be carried out by extracting with solvents such as propane or methyl ethyl ketone, termed dewaxing, with propane or methyl ethyl ketone (MEK). However, such techniques are expensive, lengthy and not always easy to carry out.

A further technique is selective cracking of the longest linear paraffin chains to form compounds with a lower molecular weight, part of which can be eliminated by distillation.

Because of their form selectivity, zeolites are among the most widely used catalysts. The idea underlying their use is that zeolitic structures exist which have pore openings which allow long linear or very slightly branched paraffins to enter their micropores but which exclude branched paraffins, naphthenes and aromatic compounds. This phenomenon leads to selective cracking of linear or very slightly branched paraffins.

Zeolite based catalysts with intermediate pore sizes such as ZSM-5, ZSM-11, ZSM-12, ZSM-22, ZSM-23, ZSM-35 and ZSM-38 have been described for their use in such processes.

Processes using such zeolites can produce oils by cracking feeds containing less than 50% by weight of linear or linear or very slightly branched paraffins. However, for feeds containing higher quantities of these compounds, it has become apparent that cracking them leads to the formation of large quantities of products with lower molecular weights such as butane, propane, ethane and methane, which considerably reduces the yield of desired products.

In order to overcome these disadvantages, we have concentrated our research on developing catalysts which also encourage isomerisation of such compounds.

SUMMARY OF THE INVENTION

The invention provides a process for improving the pour point of a paraffinic feed comprising paraffins containing more than 10 carbon atoms, in which process the feed to be treated is brought into contact with a catalyst based on EU-1 zeolite and at least one hydro-dehydrogenating element, at a temperature which is in the range 170° C. to 500° C., a pressure in the range 1 to 250 bar and an hourly space velocity in the range 0.05 to 100 $h^{-1}$, in the presence of hydrogen in a proportion of 50 to 2000 l/l of feed.

EU-1 zeolite in its hydrogen form, termed H-EU-1, obtained by calcining and/or ion exchanging as synthesized EU-1, used in the process of the invention, and its synthesis are described in European patent EP-B1 0 042 226. That zeolite has the following molar composition: 0.5 to 1.5 $R_2O$: $T_2O_3$: at least 10 $XO_2$: 0 to 100 $H_2O$, where R is a monovalent cation or 1/n of a cation with valency n, X is silicon and/or germanium, T is Al, Fe, Ga or B and the water is water of hydration which adds to the initial water present when R is H. This EU-1 zeolite is characterized by the following X ray diffraction table:

X ray diffraction table for zeolite in the form Na—H—EU-1, i.e., partially in its hydrogen form and containing sodium.

| Dhkl (Å) | I/I$_0$ |
|---|---|
| 11.11 ± 0.15 | vs |
| 10.03 ± 0.15 | vs |
| 9.78 ± 0.15 | w |
| 7.62 ± 0.15 | w |
| 6.84 ± 0.10 | m |
| 6.21 ± 0.10 | vw |
| 5.73 ± 0.10 | w |
| 4.87 ± 0.08 | vw |
| 4.60 ± 0.08 | vs |
| 4.30 ± 0.08 | vs |
| 3.97 ± 0.06 | vs |
| 3.77 ± 0.06 | s |
| 3.71 ± 0.04 | w |
| 3.63 ± 0.04 | vw |
| 3.42 ± 0.04 | m |
| 3.33 ± 0.04 | m |
| 3.27 ± 0.04 | s |
| 3.23 ± 0.04 | m |
| 3.15 ± 0.04 | w |
| 3.07 ± 0.04 | w |
| 2.93 ± 0.04 | w |
| 2.69 ± 0.04 | w |
| 2.63 ± 0.04 | vw |
| 2.57 ± 0.04 | vw |
| 2.51 ± 0.03 | w |
| 2.45 ± 0.03 | vw |
| 2.41 ± 0.03 | vw |
| 2.32 ± 0.02 | vw |
| 2.29 ± 0.02 | vw |
| 2.11 ± 0.02 | vw |

I/I$_0$ represents the relative intensities of peaks graduated on the following scale:
w = weak (I/I$_0$ in the range 0 to 20);
m = medium (I/I$_0$ in the range 20 to 40);
s = strong (I/I$_0$ in the range 40 to 60);
vs = very strong (I/I$_0$ in the range 60 to 100).

EU-1 zeolite with structure type EUO, used in the present invention has a one-dimensional microporous network with pore openings delimited by 10 T atoms (tetrahedral atoms: Si, Al, Ga, Fe . . . ), with a pore diameter of 4.1×5.7 Å. This structure is described in "The Atlas of Zeolite Structure Types", by W. M. Meier, D. H. Olson and Ch. Baerlocher, Fourth Edition, 1996. This zeolite also has wide lateral pockets along its principal channels with pore openings delimited by 10 T atoms (tetrahedral atoms: Si, Al, Oa, Fe . . . ) with dimensions of about 6.8×5.8 Å.

The term "pore opening of 10 or 12 tetrahedral atoms (T)" means pores constituted by 10 or 12 sides.

The process can advantageously convert a feed with a high pour point to a mixture (for example oil) with a lower pour point and, in the case of oil, a high viscosity index. It can also be applied to reducing the pour point of gas oils, for example.

Among others, the feed is composed of linear and/or slightly branched paraffins containing at least 10 carbon atoms, preferably 15 to 50 carbon atoms, and advantageously 15 to 40 carbon atoms. Heavy feeds contain paraffins essentially containing more than 30 carbon atoms and produce base stock; gas oils are lighter and contain paraffins containing 10–30 carbon atoms.

The isomerised products may contain about 65% to 80% of single-branched products and about 20% to 35% of multi-branched products. The term "single-branched products" means linear paraffins comprising a single methyl group, and the term "two-branched products" means linear paraffins containing 2 methyl groups which are not carried by the same carbon atom. Thus "multi-branched" paraffins can be defined by extension.

Further, the catalyst comprises at least one hydro-dehydrogenating function, for example a group VIII metal (noble or non-noble) or a combination of at least one group VIII (non noble) metal or compound and at least one group VI metal or compound, and the reaction is carried out under conditions which will be described below.

Using the EU-1 zeolite of the invention under the conditions described above can produce products with a low pour point and oils with a high viscosity index, in good yields.

DETAILED DESCRIPTION OF THE INVENTION

EU-1 zeolite has an Si/T atomic ratio in the range 5 to 600 and in particular in the range 10 to 300.

The global Si/T ratio of the zeolite and the chemical composition of the samples are determined by X ray fluorescence and atomic absorption.

The EU-1 zeolite used in the process of the invention can be obtained with the desired Si/T ratio for the catalytic application of the invention directly by synthesis by adjusting the operating conditions for synthesis. Then the zeolite is calcined and exchanged by at least one treatment using a solution of at least one ammonium salt to obtain the ammonium form of the zeolite which, once calcined, leads to the hydrogen form of the zeolite.

Advantageously, in other cases the EU-1 zeolite has undergone a treatment aimed at eliminating (removing) a portion of elements T, for example aluminium (in which case it is dealumination) so as to increase the low Si/T ratio obtained on synthesis.

This zeolite is obtained from as synthesised zeolite and thus contains silicon and an element T selected from the group formed by Al, Fe, Ga and B. A portion of elements T have been removed from the zeolite framework and advantageously they are extracted from the sample (they then pass into solution in the case of acid attack).

Thus the global Si/T atomic ratio of the zeolite is greater than that of the starting zeolite, the difference (increase) is at least equal to 10% of the Si/T ratio of the starting zeolite.

The surface Si/T atomic ratio (obtained by XPS) does not diminish, and generally it increases by a substantial amount.

The global Si/T atomic ratio is at least 10, preferably at least 20, or more preferably over 60, and generally EU-1 zeolites are used with Si/Al ratios of at most 600, preferably at most 300. Si/T ratios of 20 to 200 or even 20 to 100 are particularly advantageous.

The zeolite constitutes a further aspect of the invention.

The dealuminated EU-1 zeolite of the invention, in the preferred case where T is Al, can be prepared using two dealumination methods from as synthesised EU-1 zeolite containing an organic structuring agent. These methods are described below. However, any other method which is known to the skilled person can also be used. These methods described for aluminium (Al) can also be used for other elements T.

The first (preferred) method, direct acid attack, comprises a first calcining step carried out in dry air, at a temperature which is generally in the range 450° C. to 550° C., which eliminates the organic structuring agent present in the micropores of the zeolite, followed by a step in which the zeolite is treated with an aqueous solution of a mineral acid such as $HNO_3$ or HCl or an organic acid such as $CH_3CO_2H$. This latter step can be repeated as many times as is necessary to obtain the desired degree of dealumination. Between these two steps, one or more ion exchange steps can be carried out using at least one $NH_4NO_3$ solution, to at least partially and preferably almost completely eliminate the alkaline cation, in particular sodium. Similarly, at the end of the direct acid attack dealumination step, one or more ion exchange steps may be carried out using at least one $NH_4NO_3$ solution to eliminate residual alkaline cations, in particular sodium.

In order to obtain the desired Si/Al ratio, the operating conditions must be correctly selected; the most critical parameters in this respect are the temperature of the treatment with the aqueous acid solution, the concentration of the latter, its nature, the ratio between the quantity of acid solution and the mass of the treated zeolite, the treatment period and the number of treatments carried out.

Dealumination can also be achieved using chemical dealuminating agents such as (by way of non exhausting examples) silicon tetrachloride ($SiCl_4$), ammonium hexafluorosilicate [$(NH_4)_2SiF_6$], and ethylenediaminetetraacetic acid (EDTA), including its mono and disodium forms. These reactants can be used in solution or in the gaseous phase, for example in the case of $SiCl_4$.

The second method, heat treatment (in particular using steam, by steaming)+acid attack, comprises firstly calcining in dry air at a temperature which is generally in the range 450° C. to 550° C., to eliminate the organic structuring agent occluded in the micropores of the zeolite. The solid obtained then undergoes one or more ion exchanges using at least one $NH_4NO_3$ solution, to eliminate at least a portion, preferably practically all, of the alkaline cation, in particular sodium, present in the cationic position of the zeolite. The zeolite obtained then undergoes at least one framework dealumination cycle comprising at least one heat treatment which is optionally and preferably carried out in the presence of steam, at a temperature which is generally in the range 500° C. to 900° C., and followed by at least one acid attack using an aqueous solution of a mineral or organic acid as defined above. The conditions for calcining in the presence of steam (temperature, steam pressure and treatment period), also the post-calcining acid attack conditions (attack period, concentration of acid, nature of acid used and the ratio between the volume of the acid and the mass of zeolite) are adapted so as to obtain the desired level of dealumination. For the same reason, the number of heat treatment-acid attack cycles can be varied.

In a variation of this second method, the acid attack step, i.e., treatment using a solution of an acid, can be replaced by treatment with a solution of a chemical dealuminating compound such as those cited above, for example, namely silicon tetrachloride ($SiCl_4$), ammonium hexafluorosilicate [$(NH)_2SiF_6$], ethylenediaminetetra-acetic acid (EDTA), including its mono and disodium forms.

In the preferred case when T is Al, the framework dealumination cycle, comprising at least one heat treatment step, optionally and preferably carried out in the presence of steam, and at least one attack step carried out in an acid medium on the EU-1 zeolite, can be repeated as often as is necessary to obtain the dealuminated EU-1 zeolite having the desired characteristics. Similarly, following the heat treatment, optionally and preferably carried out in the presence of steam, a number of successive acid attacks can be carried out using different acid concentrations.

In a variation of this second calcining method, heat treatment of the EU-1 zeolite containing the organic structuring agent can be carried out at a temperature which is generally in the range 500° C. to 850° C., optionally and preferably in the presence of steam. In this case, the steps of calcining the organic structuring agent and dealuminating the framework are carried out simultaneously. The zeolite is then optionally treated with at least one aqueous solution of a mineral acid (for example $HNO_3$ or HCl) or an organic acid (for example $CH_3CO_2H$). Finally, the solid obtained can optionally undergo at least one ion exchange step using at least one $NH_4NO_3$ solution, to eliminate practically all of the alkaline cations, in particular sodium, present in the cationic position in the zeolite.

The modified EU-1 zeolite (and advantageously that in which the global to Si/T ratio is at least 20 or over 20) of the invention is at least partially, preferably practically completely, in its acid form, i.e., in its hydrogen ($H^+$) form. The Na/T atomic ratio is generally less than 10%, preferably less than 5%, and more preferably less than 1%. Preferably, the modified EU-1 has a global Si/T ratio of 20 to 200, preferably 20 to 100.

The catalyst of the invention contains EU-1 zeolite with an Si/T ratio of at least 10, which may or may not be mixed with a matrix, and optionally at least one hydro-dehydrogenating element, which is a noble metal or a combination of at least one group VI metal or compound and at least one group VIII metal or compound.

The catalyst used in the process of the invention contains at least one hydro-dehydrogenating element, for example at least one group VIII metal. It may be a noble metal, advantageously selected from the group formed by Pt or Pd, which is introduced into the molecular sieve by dry impregnation or ion exchange, for example, or by any other method which is known to the skilled person, or it is introduced into the matrix.

The amount of metal thus introduced, expressed as the weight % with respect to the mass of molecular sieve engaged, is generally less than 5%, preferably less than 3%, and the amount of noble metal in the catalyst is generally less than 2% by weight.

The hydro-dehydrogenating element can also be a combination of at least one group VI metal or compound (for example molybdenum or tungsten) and at least one group VIII metal or compound (for example nickel or cobalt). The total concentration of group VI and group VIII metals, expressed as the metal oxides with respect to the support, is generally in the range 5% to 40% by weight, preferably in the range 7% to 30% by weight. The weight ratio (expressed as the metallic oxides) of group VIII metals to group VI metals is preferably in the range 0.05 to 0.8: more preferably in the range 0.13 to 0.5.

The element can also be rhenium and/or niobium, used alone or in combination with the group VIII and/or VI elements.

This type of catalyst can advantageously contain phosphorous, the content of which is generally less than 15% by weight, preferably less than 10% by weight, expressed as phosphorous oxide $P_2O_5$ with respect to the support.

When treating a real feed, the molecular sieve of the invention is first formed. In a first variation, the molecular sieve can have at least one group VIII metal, radical selected from the group formed by platinum and palladium, deposited on it, and it can be formed by any technique which is known to the skilled person. In particular, it can be mixed with a matrix, which is generally amorphous, for example a moist alumina gel powder. The mixture is then formed, for example by extrusion through a die. The amount of molecular sieve in the mixture obtained is generally in the range 0.5% to 99.9%, advantageously in the range 5% to 90% by weight, with respect to the mixture (molecular sieve+matrix) and preferably in the range 10% to 90%, more preferably in the range 20% to 70%.

In the remaining text, the term "support" is used to describe the molecular sieve+matrix mixture.

Forming can be carried out with matrices other than alumina, such as magnesia, amorphous silica-aluminas, natural clays (kaolin, bentonite, sepiolite, attapulgite), silica, titanium oxide, boron oxide, zirconia, aluminium phosphates, titanium phosphates, zirconium phosphates, and mixtures thereof. Techniques other than extrusion, such as pelletization or bowl granulation, can be used.

The group VIII hydrogenating metal, preferably Pt and/or Pd, can also very advantageously be deposited on the support using any process which is known to the skilled person which can deposit metal on the molecular sieve. Competitive cation exchange can be used, with ammonium nitrate as the preferred competing agent, the competition ratio being at least about 20 and advantageously about 30 to 200. When platinum or palladium is used, a platinum tetramine complex or a palladium tetramine complex is normally used: these latter are almost completely deposited on the molecular sieve. This cation exchange technique can also be used to deposit the metal directly on powdered molecular sieve before mixing it with any matrix.

Deposition of the group VIII metal(s) is generally followed by calcining in air or oxygen, usually between 300° C. and 600° C. for 0.5 to 10 hours, preferably between 350° C. and 550° C. for 1 to 4 hours. Reduction in hydrogen can then follow, generally at a temperature which is in the range 300° C. to 600° C. for 1 to 10 hours, preferably in the range 350° C. to 550° C. for 2 to 5 hours.

The platinum and/or palladium can also be deposited not directly on the molecular sieve, but on the matrix (alumina binder) before or after forming, by anion exchange with hexachloroplatinic acid, hexachloropalladic acid and/or palladium chloride in the presence of a competing agent, for example hydrochloric acid. As before, after depositing the platinum and/or palladium, the catalyst is generally calcined then reduced in hydrogen as indicated above.

The non noble group VIII metals or an association of oxides of non noble group VI and VIII metals, comprising the hydro-dehydrogenating function, can be introduced into the catalyst at various stages of the preparation and in various fashions.

It can be introduced only in part (for associations of group VI and VIII metal oxides) or completely on mixing the molecular sieve of the invention with the gel of the oxide selected as the matrix. It can be introduced using one or more ion exchange operations on the calcined support constituted by the molecular sieve of the invention dispersed in the selected matrix, using solutions containing precursor salts of the selected metals when these belong to group VIII. They may be introduced by one or more impregnation operations carried out on the formed and calcined support, using a solution of precursors of oxides of metals from group VIII (in particular cobalt or nickel) when the precursors of oxides of metals from group VI (in particular molybdenum or tungsten) have been introduced first on mixing the support. Finally, it can be introduced by one or more impregnation operations carried out on the calcined support constituted by a molecular sieve of the invention and the matrix, using solutions containing the precursor of the oxides of metals from groups VI and/or VIII, the precursors of oxides from group VIII metals preferably being introduced after those of group VI or at the same time as the latter. Impregnation methods lead to a deposit of group VIII metal essentially on the binder.

When the metal oxides are introduced in a plurality of impregnation steps using the corresponding precursor salts, an intermediate calcining step must be carried out at a temperature in the range 250° C. to 600° C.

Molybdenum impregnation can be facilitated by adding phosphoric acid to the ammonium paramolybdate solutions.

The mixture is then formed, for example by extrusion through a die. The amount of molecular sieve in the mixture obtained is generally in the range 0.5% to 99.9%, advantageously in the range 10% to 90% by weight with respect to the mixture (molecular sieve+matrix), preferably in the range 20% to 70%.

Deposit of the final metal is generally followed by calcining in air or in oxygen, usually between 300° C. and 600° C. for 0.5 to 10 hours, preferably between 350° C. and 550° C. for 1 to 4 hours.

It is then generally followed by sulphuration of the catalyst before bringing it into contact with the feed, using any method known to the skilled person. Thus in this case the catalyst advantageously contains sulphur.

The catalyst of the invention is used to convert hydrocarbons, in particular to reduce the pour point as will be defined below.

The process for reducing the pour point as defined below can also be carried out using a catalyst containing a EU-1 zeolite, obtained by synthesis, with the formula described above, in particular with a Si/T ratio of 5 to 600, advantageously 10 to 300. Zeolites with Si/T ratios of less than 10 are thus included.

Feeds which can be treated using the process of the invention are advantageously fractions with relatively high pour points the values of which are to be reduced.

EXAMPLES

The process of the invention can be used to treat a variety of feeds, from relatively light fractions such as kerosenes and jet fuels to feeds with higher boiling points such as middle distillates, vacuum residues, gas oils, middle distillates from FCC (LCO and HCO) and hydrocracking residues.

The feed to be treated is, for the most part, a $C_{10}^+$ cut with an initial boiling point of more than about 175° C., preferably a heavy cut with a boiling point of at least 280° C., advantageously a boiling point of at least 380° C. The process of the invention is particularly suitable for treating paraffinic distillates such as middle distillates which encompass gas oils, kerosenes, jet fuels, vacuum distillates and all other fractions with a pour point and viscosity which must be adapted to satisfy specifications.

Feeds which can be treated using the process of the invention can contain paraffins, olefins, naphthenes, aromatics and heterocycles and have a high proportion of high molecular weight n-paraffins and very slightly branched paraffins, also of high molecular weight.

The reaction is carried out so that the cracking reactions remain sufficiently low to render the process economically viable. The amount of cracking reactions is generally below 40% by weight, preferably below 30%, and advantageously below 20%.

Typical feeds which can advantageously be treated by the process of the invention generally have a pour point of more than 0° C. The products resulting from treatment in accordance with the process have pour points of below 0° C., preferably below about −10° C.

These feeds contain amounts of n-paraffins and very slightly branched paraffins containing more than 10 carbon atoms, also with high molecular weight, of over 30% and up to about 90%, and in some cases more than 90% by weight. The process is of particular interest when this proportion is at least 60% by weight.

Non limiting examples of other foods which can be treated in accordance with the invention are bases for lubricating oils, synthesised paraffins from the Fischer-Tropsch process, high pour point polyalphaolefins, synthesised oils, etc . . . . The process can also be applied to other compounds cottaining an n-alkane chain such as those defined above, for example n-alkylcycloalkanes, or containing at least one aromatic group.

The process is carried out under the following operating conditions:
  the reaction temperature is in the range 170° C. to 500° C., preferably in the range 180° C. to 470° C., advantageously 190° C. to 450° C.;
  the pressure is in the range 1 to 250 bar, preferably in the range 10 to 200 bar;
  the hourly space velocity (HSV expressed as the volume of feed injected per unit volume of catalyst per hour) is in the range about 0.05 to about 100, preferably about 0.1 to about 30 $h^{-1}$.

The feed and the catalyst are brought into contact in the presence of hydrogen. The amount of hydrogen used, expressed in liters of hydrogen per liter of feed, is in the range 50 to about 2000 liters of hydrogen per liter of feed, preferably in the range 100 to 1500 liters of hydrogen per liter of feed.

The quantity of nitrogen compounds in the feed to be treated is preferably less than about 200 ppm by weight, more preferably less than 100 ppm by weight. The sulphur content is below 1000 ppm by weight, preferably less than 500 ppm, more preferbly less than 200 ppm by weight. The quantity of metals in the feed, such as Ni or V, is extremely low, i.e., less than 50 ppm by weight, preferably less than 10 ppm by weight and more preferably less than 2 ppm by weight.

The compounds obtained using the process of the invention may be single-branched, two-branched and multi-branched compounds, advantageously with methyl groups.

The following examples illustrate the invention without limiting its scope.

Example 1

Preparation of Catalyst C1 in Accordance with the Invention

The starting material was an EU-1 zeolite prepared in accordance with Example 4 of EP-B1-0 042 226, with a global Si/Al atomic ratio of 17.5, and a Na/Al atomic ratio of 0.8.

This EU-1 zeolite first underwent dry calcining at 550° C. in a stream of dry air for 18 hours. The solid obtained underwent four ion exchange steps in a solution of 10 N $NH_4NO_3$ at about 100° C. for 4 hours for each exchange step. The solid obtained was designated as $NH_4$-EU-1/1 and had an Si/Al ratio of 18.1 and an Na/Al ratio of 0.003. The remaining physico-chemical characteristics are shown in Table 1.

TABLE 1

| Sample | Adsorption | |
|---|---|---|
| | $S_{BET}$ $(m^2/g)$ | $V(P/P_0 = 0.19)$ ml liquid $N_2$/g |
| $NH_4$-EU-1/1 | 434 | 0.18 |

The EU-1 crystallites were in the form of crystals 0.6 μm to 3 μm in size.

The $NH_4$-EU-1/1 zeolite was mixed with SB3 type alumina from Condéa. The mixed paste was extruded through a 1.4 mm die. The extrudates were then calcined at 500° C. for 2 hours in air then dry impregnated with a solution of platinum tetramine chloride $[Pt(NH_3)_4]Cl_2$, and finally calcined in air at 550° C. The platinum content in the final catalyst C1 was 0.7% by weight and the zeolite content, expressed with respect to the ensemble of the catalyst mass, was 30% by weight.

Example 2

Preparation of Catalyst C2 in Accordance with the Invention

The starting material was a EU-1 zeolite prepared in accordance with Example 4 of EP-A2-0 042 226 with a global Si/Al atomic ratio of 38.4, and contained sodium.

This EU-1 zeolite first underwent dry calcining at 550° C. in a stream of dry air for 18 hours. The solid obtained underwent four ion exchange steps in a solution of 10 N $NH_4NO_3$ at about 100° C. for 4 hours for each exchange step. The solid obtained was designated as $NH_4$-EU-1/1 and had in Si/Al ratio of 39.6 and an Nm/Al ratio of 0.002. The remaining physico-chemical characteristics as shown in Table 2.

TABLE 2

| Sample | Adsorption | |
|---|---|---|
| | $S_{BET}$ $(m^2/g)$ | $V(P/P_0 = 0.19)$ ml liquid $N_2$/g |
| NH4-EU-1/2 | 427 | 0.18 |

The $NH_4$-EU-1/2 obtained then underwent ion exchange using a solution of platinum tetramine chloride $[Pt(NH_3)_4]Cl_2$ using the following protocol. The $NH_4$-EU-1/2 was suspended in an ammonium nitrate solution such that the molar ratio $R=[NH_4^+]/2*[Pt(NH_3)_4]Cl_2$ was 25. The quantity of $[Pt(NH_3)_4]Cl_2$ complex introduced was such that the metallic platinum content (Pt) on the dry zeolite was 0.8%.

The $Pt/NH_4$-EU-1/2 zeolite prepared was mixed with SB3 type alumina from Condéa. The mixed paste was extruded through a 1.4 mm die. The extrudates were then calcined at 550° C. for 4 hours in air. The platinum content in the final catalyst C2 was 0.16% by weight and the zeolite content, expressed with respect to the ensemble of the catalyst mass, was 50% by weight.

Example 3

Preparation of Catalyst C3 in Accordance with the Invention

The starting material was a EU-1 zeolite prepared in accordance with Example 5 of EP-B1-0 042 226, with a global Si/Al atomic ratio of 60, containing sodium.

This EU-1 zeolite first underwent dry calcining at 550° C. in a stream of dry air for 18 hours. The solid obtained underwent four ion exchange steps in a solution of 10 N $NH_4NO_3$ at about 100° C. for 4 hours for each exchange step. The solid obtained was designated as $NH_4$-EU-1/3 and had an Si/Al ratio of 63 and an Na/Al ratio of 0.002. The remaining physico-chemical characteristics are shown in Table 3.

TABLE 3

| Sample | Adsorption | |
|---|---|---|
| | $S_{BET}$ $(m^2/g)$ | $V(P/P_0 = 0.19)$ ml liquid $N_2$/g |
| $NH_4$-EU-1/3 | 449 | 0.19 |

The $NH_4$-EU-1/3 zeolite was mixed with SB3 type alumina from Condéa. The mixed paste was extruded through a 1.4 mm die. The extrudates were then dry impregnated with a solution of a mixture of ammonium heptamolybdate, nickel nitrate and orthophosphoric acid, and finally calcined in air at 550° C., in-situ in the reactor. The amounts by weight of active oxides were as follows (with respect to catalyst C3 thus prepared):

5.2% by weight of phosphorous oxide $P_2O_5$ 15.2% by weight of molybdenum oxide $MoO_3$;

2.8% by weight of nickel oxide NiO.

The amount of EU-1/3 zeolite in the whole of catalyst C3 was 70%.

Example 4

Preparation of Catalyst C4 in Accordance with the Invention

The starting material was an EU-1 zeolite prepared in accordance with Example 1 of EP-B1-0 042 226 with a global Si/Al atomic ratio of 17.5, and an Na/Al atomic ratio of 0.8.

This EU-1 zeolite first underwent dry calcining at 550° C. in a stream of dry air for 18 hours. The solid obtained underwent three ion exchange steps in a solution of 10 N $NH_4NO_3$ at about 100° C. for 4 hours for each exchange step. The solid obtained then underwent two successive treatments using 13 N nitric acid solutions with a volume ratio of nitric acid solution/zeolite mass of 10 ml/g, under reflux for 4 hours. The solid obtained was designated as $NH_4$-EU-1/4 and had an Si/Al ratio of 59.7 and an Na/Al ratio of 0.002. The remaining physico-chemical characteristics are shown in Table 4.

TABLE 4

| Sample | Adsorption | |
|---|---|---|
| | $S_{BET}$ (m²/g) | $V(P/P_0 = 0.19)$ ml liquid $N_2$/g |
| NH-EU-1/4 | 409 | 0.16 |

The EU-1 crystallites were in the form of crystals 0.6 μm to 3 μm in size.

The $NH_4$-EU-1/4 zeolite was mixed with SB3 type alumina from Condéa. The mixed paste was extruded through a 1.4 mm die. The extrudates were then calcined at 500° C. for 2 hours in air then dry impregnated with a solution of platinum tetramine chloride $[Pt(NH_3)_4]Cl_2$, and finally calcined in air at 550° C. The platinum content in the final catalyst C4 was 0.7% by weight and the zeolite content, expressed with respect to the ensemble of the catalyst mass, was 80% by weight.

Example 5

Evaluation of Catalysts C1, C2 and C4 on a Hydrocracking Residue

Catalysts C1, C2 and C4 were evaluated by treating a hydrocracking residue from a vacuum distillate.

The feed had the following characteristics:

| | |
|---|---|
| Sulphur content (ppm by weight) | 13 |
| Nitrogen content (ppm by weight) | 2 |
| Pour point (° C.) | +36 |
| Initial boiling point | 292 |
| 10% | 343 |
| 50% | 425 |
| 90% | 475 |
| End point | 536 |

Catalysts C1 and C2 prepared as described above in Examples 1 and 2 were used to prepare a base stock from the feed described above.

The catalyst had been reduced, in situ in the reactor, in hydrogen at 450° C. before the catalytic test. This reduction was carried out in stages. It consisted of a stage at 150° C. for 2 hours, then an increase of the temperature to 450° C. at a rate of 1° C./min, then a stage of 2 hours at 450° C. During this reduction procedure, the hydrogen flow rate was 1000 liters of $H_2$ per liter of catalyst.

The reaction took place at 315° C. at a total pressure of 12 MPa, an hourly space velocity of 2 $h^{-1}$ end at a hydrogen flow rate of 1000 liters of $H_2$ per liter of feed. Under these operating conditions, the net conversion of 400° compounds (with a boiling point of less than 400° C.) was 25% by weight and the base stock yield was about 75% by weight.

The characteristics of the oil obtained are shown in the following table.

| | Catalyst C1 | Catalyst C2 | Catalyst C4 |
|---|---|---|---|
| Viscosity index VI | 125 | 120 | 120 |
| Pour point | −14 | −17 | −20 |
| Oil yield (wt %) | 73 | 75 | 77 |

These examples show the importance of the process of the invention which can reduce the pour point of the initial feed, in the cast of a hydrocracking residue, while retaining a high viscosity (VI).

Example 6

Evaluation of Catalyst C3

Catalyst C3 prepared as in Example 3 was evaluated for hydroisomerisation of a hydrocracking residue from a vacuum distillate.

The feed had the following characteristics:

| | |
|---|---|
| Sulphur content (ppm by weight) | 105 |
| Nitrogen content (ppm by weight) | 15 |
| Pour point (° C.) | +41 |
| Initial boiling point | 365 |
| 5% | 428 |
| 10% | 438 |
| 50% | 481 |
| 90% | 495 |
| 95% | 532 |
| End point | 536 |

The catalytic test unit comprised a fixed bed reactor in upflow feed mode into which 80 ml of catalyst was introduced. Each catalyst was sulphurated using a n-hexane/DMDS+aniline mixture up to 350° C. The total pressure was 12 MPa, the hydrogen flow rate was 1000 liters of hydrogen gas per liter of injected feed, and the hourly space velocity was 1.0 $h^{-1}$.

The reaction took place at 330° C. at a total pressure of 12 MPa, an hourly space velocity of 1.1 $h^{-1}$ and at a hydrogen flow rate of 1000 liters of $H_2$ per liter of feed.

The characteristics of the oil obtained after hydroisomerisation are shown in the following table

| | |
|---|---|
| Viscosity index VI | 118 |
| Pour point (° C.) | −19 |
| Oil/feed yield (wt %) | 78 |

This example shows the importance of using the catalyst of the invention which can reduce the pour point of the initial feed, in the case of a hydrocracking residue, while retaining a high viscosity index (VI).

What is claimed is:

1. A process for improving the pour point of a feed comprising paraffins containing more than 10 carbon atoms, in which process the feed to be treated is brought into contact with a catalyst based on EU-1 zeolite, at least partially in its acid form, and at least one hydro-dehydrogenating element, at a temperature of 170° C. to 500° C., a pressure of 1 to 250 bar and at an hourly space velocity of 0.05 to 100 $h^{-1}$, the presence of hydrogen in a proportion of 50 to 2000 l/l of feed.

2. A process according to claim 1, in which the hydro-dehydrogenating element is a noble group VIII element.

3. A process according to claim 1, in which the hydro-dehydrogenating element is a combination of at least one group IV metal or compound and at least one non noble group VIII metal or compound.

4. A process according to claim 3, in which the catalyst contains phosphorous.

5. A process according to claim 1, in which the catalyst contains a matrix and 0.5% to 99.9% by weight of EU-1 zeolite with respect to the matrix+zeolite mixture.

6. A process according to claim 1, in which the initial boiling point of the feed is over 175° C.

7. A process according to claim 1, in which the initial boiling point of the feed is over 280° C.

8. A process according to claim 1, in which the initial boiling point of the feed is over 380° C.

9. A process according to claim 1, in which the feed comprises paraffins containing 15 to 50 carbon atoms.

10. A process according to claim 1, in which the feed contains paraffins containing 15 to 40 carbon atoms.

11. A process according to claim 1, in which the feed to be treated is a hydrocarbon feed selected from the group consisting of middle distillates, gas oils, vacuum residues, hydrocracking residues, paraffins from the Fischer-Tropsch process, synthesized oils, gas oil cuts and FCC middle distillates, oils, and polyalphaolefins.

12. A process for improving the pour point of a feed comprising paraffins containing more than 10 carbon atoms, comprising contacting the feed with a catalyst based on EU-1 zeolite, at least partially in its acid form, and at least one hydro-dehydrogenating element, wherein the EU-1 zeolite comprises silicon and an element T which is Al, Fe, Ga, or B, produced by a process in which at least a portion of elements T are removed from a starting zeolite, whereby the modified zeolite has a global atomic ratio Si/T higher than that of the starting zeolite, by at least 10% of the Si/T ratio of the starting zeolite.

13. A process according to claim 12, in which Si/T of the modified zeolite is at least 20.

14. A process according to claim 12, in which Si/T of the modified zeolite is over 60.

15. A process according to claim 12, in which Si/T of the modified zeolite is at most 600.

16. A process according to claim 12, in which Si/T of the modified zeolite is at most 300.

17. A process according to claim 12, in which T is aluminum (Al).

18. A process according to claim 12, wherein the zeolite is obtained using at least one heat treatment of the starting zeolite followed by at least one treatment with a solution of an acid.

19. A process according to claim 12, in which the EU-1 zeolite is obtained by dealuminating by at least one heat treatment followed by at least one treatment using a chemical dealuminating compound which is ammonium hexafluorosilicate, silicon tetrachloride, or ethylenediaminetetra-acetic acid, optionally in its sodium or disodium form.

20. A process according to claim 12, in which the EU-1 zeolite is obtained by dealuminating by at least one treatment with a chemical dealuminating compound which is ammonium hexafluorosilicate, silicon tetrachloride, or ethylenediaminetetra-acetic acid, optionally in its sodium and disodium form.

21. A process according to claim 12, wherein the catalyst comprises at least one matrix and 0.5% to 99.5% by weight of EU-1 zeolite with respect to the matrix+zeolite mixture.

22. A process according to claim 12, in which the hydro-dehydrogenating element is niobium and/or rhenium.

23. A process for improving the pour point of a feed comprising paraffins containing more than 10 carbon atoms, in which process the feed to be treated is brought into contact with a catalyst based on EU-1 zeolite, at least partially in its acid form, and at least one hydro-dehydrogenating element, at a temperature of 170° C. to 500° C., a pressure of 1 to 250 bar and at an hourly space velocity of 0.05 to 100 h$^{-1}$, the presence of hydrogen in a proportion of 50 to 2000 l/l of feed and wherein the EU-1 zeolite is produced with at least one alkylated derivative of a polymethylene α-ω-diamine having the formula

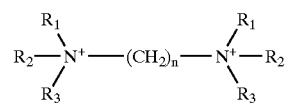

or an amine degradation product thereon, wherein n is 3 to 12 and $R_1$ to $R_6$ are each independently alkyl or hydroxyalkyl groups, containing from 1 to 8 carbon atoms and up to five of the groups $R_1$–$R_6$ can be hydrogen.

24. A process according to claim 23, wherein the EU-1 zeolite is obtained by synthesis using at least one solution of an acid.

25. A process according to claim 23, wherein the polymethylene α-ω diamine is an alkylated hexamethylene diamine.

26. A process according to claim 25, wherein the polymethylene α-ω diamine is hexamethonium salt.

27. A process for improving the pour point of a feed comprising paraffins containing more than 10 carbon atoms, in which process the feed to be treated is brought into contact with a catalyst based on EU-1 zeolite, at least partially in its acid form, and at least one hydro-dehydrogenating element, wherein the EU-1 zeolite comprises silicon and an element T which is Al, Fe, Ga, or B, produced by a process in which at least a portion of elements T are removed from a starting zeolite, whereby the modified zeolite has a global atomic ratio Si/T higher than that of the starting zeolite, by at least 10% of the Si/T ratio of the starting zeolite and wherein the EU-1 zeolite is produced with at least one alkylated derivative of a polymethylene α-ω-diamine having the formula

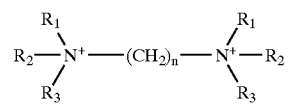

of an amine degradation product thereon, wherein n is 3 to 12 and $R_1$ to $R_6$ are each independently alkyl or hydroxyalkyl groups, containing from 1 to 8 carbon atoms and up to five of the groups $R_1$–$R_6$ can be hydrogen.

28. A process according to claim 27, wherein the polymethylene α-ω diamine is an alkylated hexamethylene diamine.

29. A process according to claim 28, wherein the polymethylene α-ω diamine is hexamethonium salt.

* * * * *

UNITED STATES PATENT AND TRADEMARK OFFICE
CERTIFICATE OF CORRECTION

PATENT NO. : 6,733,658 B2  
DATED : May 11, 2004  
INVENTOR(S) : Eric Benazzi et al.

It is certified that error appears in the above-identified patent and that said Letters Patent is hereby corrected as shown below:

Column 13,
Line 21, reads "clement" should read -- element --

Signed and Sealed this

Sixteenth Day of November, 2004

JON W. DUDAS
*Director of the United States Patent and Trademark Office*